United States Patent Office 2,830,455
Patented Apr. 15, 1958

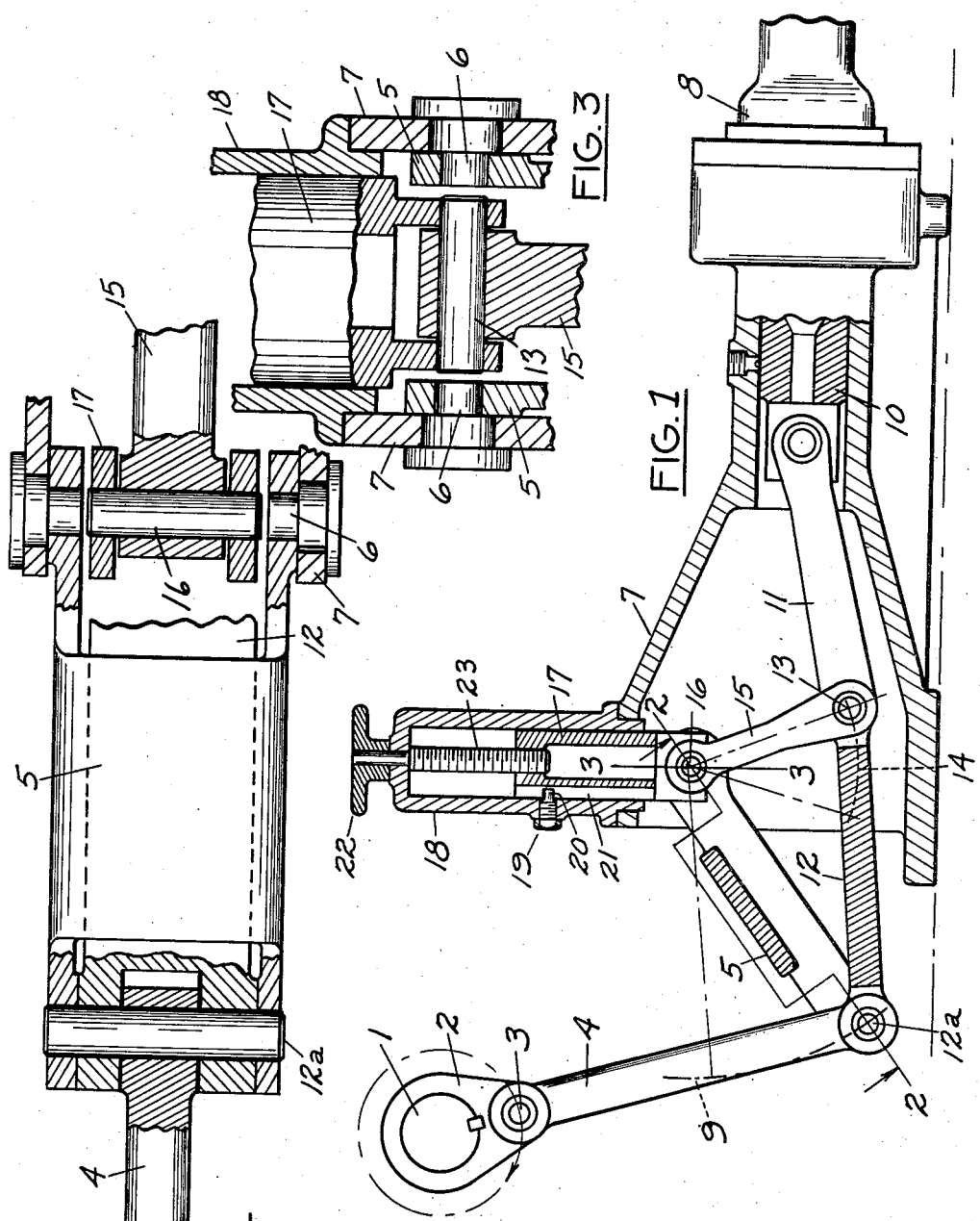

2,830,455
VARIABLE STROKE PUMP

Arthur R. Harmon, Port Republic, N. J., assignor to Philadelphia Pump & Machinery Company, Philadelphia, Pa., a corporation of Delaware Application December 6, 1955, Serial No. 551,369

4 Claims. (Cl. 74—40)

This invention is a reciprocating pump or the like in which the stroke can easily be adjusted under load because sliding parts are avoided in the active or power part of the leakage, and much of the reciprocating thrust is taken by a radius rod mounted on a fixed pivot which can easily be lubricated.

In the drawing, Fig. 1 is a sectional elevation of the reciprocating drive and its adjustment, Fig. 2 is a section on line 2—2 of Fig. 1, and Fig. 3 is a section on line 3—3 of Fig. 1.

The conventional parts of the drive are readily identified, 1 being the crankshaft, 2 the crank arm and 3 the crank pin connected to one end of a connecting rod 4. As the crankshaft 1 rotates, the connecting rod 4 reciprocates through a fixed stroke of length determined by the crank arm 2. The other end of the connecting rod is connected to a radius rod 5 mounted on a fixed pivot 6 in a frame 7 carrying the pump body 8. As the crankshaft 1 rotates, the radius rod 5 reciprocates through an arc indicated by dotted lines 9. In the frame 7 is a crosshead 10 connected to one end of a connecting rod 11. The other end of the connecting rod 11 is connected to the radius rod 5 and to the connecting rod 4 by a link 12 of the same length as the radius rod. There is a common pivot 12a for the link 12 and the radius rod 5. When the links 11 and 12 are substantially aligned with each other as illustrated, the oscillation of the radius rod 5 causes the common pivot pin 13 between the connecting rod 11 and the link 12 to oscillate through an arc indicated by dotted lines 14. This corresponds to a definite length of stroke of the crosshead 10. In order to change the stroke of the crosshead 10, there is an adjusting mechanism consisting of a link 15 connected between the common pivot 13 and a pivot 16 on a vertically adjustable slide 17. The slide 17 is non-rotatably keyed to a tubular extension 18 of the frame 7 by a set screw 19 having its inner end 20 received in a key way 21. The slide 17 is moved vertically by a hand wheel 22 on a screw 23 threaded into the upper end of the slide. The slide 17 is shown in its lowermost position where the pivot 16 for the link 15 is coaxial with the pivot 6 for the radius rod 5. As the slide is raised, the pivot 16 for the link 15 is raised lifting the common pivot 13 between the connecting rod 11 and the link 14. As the common pivot 13 comes closer to the pivot 6 for the radius rod 5, the amplitude of reciprocation of the common pivot 13 decreases thereby producing a corresponding reduction in the stroke of the crosshead. When the common pivot 13 coincides with the pivot 6 for the radius rod 5, the stroke of the crosshead 10 is reduced to zero. By the above described construction, it is accordingly possible to obtain adjustment of the stroke of the crosshead which can be made under load.

It will be noted that in all positions, a considerable part of the driving thrust is taken by the radius rod 5. When the connecting rod 11 and link 12 are substantially aligned with each other, substantially all of the reciprocating forces are taken by the radius rod 5. The only force required of the link 15 is that needed to hold the links 11 and 12 in alignment. As the link 15 is pulled upward to decrease the stroke of the crosshead 10, some force will be transmitted through the link 15 to the common pivot 13 but this force will only be that required to hold the links 11 and 12 in their off-center position. For the proportions illustrated, the force in the link 15 will always be less than the force in the radius rod 5. Accordingly, the adjustment of the stroke does not encounter the full operating force which would make the stroke adjustment under load difficult.

It will be noted that all of the power transmitting joints between the crankshaft 1 and the crosshead 10 are pivot bearings which are easier to lubricate than slide bearings. This contributes to the ease of adjustment of the stroke under load.

Although a hand wheel 22 is shown for effecting the adjustment, other manual or automatic means may be used.

What is claimed as new is:

1. In a variable stroke reciprocating pump unit, a crosshead for reciprocating a piston, a connecting rod connected to the crosshead, a radius rod having one end carried on a fixed pivot offset to one side of the connecting rod, a reciprocating drive member connected to the radius rod, a link of the same length as the radius rod connected at one end to the radius rod and at the other end having a hinged connection to the connecting rod, and another link extending transverse to the first link and connected between the hinged connection and an adjustable abutment offset on the same side of the connecting rod as said fixed pivot.

2. In a variable stroke unit, a connecting rod for connection to a reciprocating member, a radius rod having one end carried on a fixed pivot offset to one side of the connecting rod, a reciprocating drive member connected to the radius rod, a link of the same length as the radius rod connected at one end to the radius rod and at the other end having a hinged connection to the connecting rod, and another link extending transverse to the first link and connected between said hinged connection and an adjustable abutment offset on the same side of the connecting rod as said fixed pivot.

3. In a variable stroke reciprocating pump unit, a crosshead for reciprocating a piston, a connecting rod connected to the crosshead, a radius rod having one end carried on a pivot offset to one side of the connecting rod, a reciprocating drive member connected to the radius rod, a link connected at one end to the radius rod and at the other end having a hinged connection to the connecting rod, and another link extending transverse to the first link and connected between the hinged connection and an abutment offset on the same side of the connecting rod as said pivot, the abutment and pivot being relatively movable toward and away from each other to vary the stroke of the crosshead.

4. In a variable stroke reciprocating pump unit, a crosshead for reciprocating a piston, a frame carrying the crosshead, a connecting rod connected to the crosshead, a radius rod having one end carried on a fixed pivot in the frame offset to one side of the connecting rod, a reciprocating drive member connected to the radius rod, a link of the same length as the radius rod connected at one end to the radius rod and at the other end having a hinged connection to the connecting rod, an adjustable slide in the frame offset on the same side of the connecting rod as said fixed pivot and slidable along an axis extending through said fixed pivot, and another link extending transverse to the first link and connected between the hinged connection and a pivot on said slide.

References Cited in the file of this patent

UNITED STATES PATENTS

| | | |
|---|---|---|
| 649,708 | Prindle | May 15, 1900 |
| 905,823 | Montgomery | Dec. 1, 1908 |